UNITED STATES PATENT OFFICE.

JOHN HELTON, OF CARTER'S DEPOT, ASSIGNOR OF PART OF HIS RIGHT TO LORENZO DOW POTEET AND DAVID A. HOLLY, OF ELIZABETHTON, TENNESSEE.

IMPROVEMENT IN MEDICAL COMPOUNDS.

Specification forming part of Letters Patent No. 155,581, dated October 6, 1874; application filed December 18, 1873.

*To all whom it may concern:*

Be it known that I, JOHN HELTON, of Carter's Depot, Carter county, State of Tennessee, have invented a certain compound called "Fever Specific," of which the following is a specification:

This invention relates to the production of a new medical compound particularly adapted as a cure for, and preventive against, fevers, chills and fever, cholera, and similar diseases; and it consists in mixing an extract of the root or plant, or the pulverized root, of the *Astilbe decandra* with arnica, in certain proportions, as circumstances may dictate.

The *Astilbe decandra* belongs to the natural order of *Saxifragaceæ*, an umbelliferous plant or shrub, and has proved to be a specific for different kinds of fevers, chills and fever, yellow fever, and other similar diseases.

In order to make an extract, the root, as well as the plant, is placed in a vessel with distilled boiling water, in proportion of one pound of the root or plant to one pound of distilled water, and boiled down to one-half the weight. The root alone may, however, in some cases, be pulverized. The extract or powder of the *Astilbe decandra* having been thus prepared, I add to the same arnica, in the proportion of five grains of the extract or powder of the *Astilbe decandra* to one grain of arnica.

Having thus described my invention, what I claim, and desire to secure by Letters Patent, is—

The medical compound herein described, composed of an extract or pulverized root of *Astilbe decandra* and arnica, as and for the purpose set forth.

JOHN HELTON.

Witnesses:
 ABRAHAM JOBE,
 ETHELBERT DUDLEY JOBE.